(12) United States Patent
Lam (10) Patent No.: US 10,529,035 B2
(45) Date of Patent: *Jan. 7, 2020

(54) METHOD AND SYSTEM FOR RECOMMENDING ACTIVITIES TO A COMMUNITY OF CONTACTS

(71) Applicant: Amazon Technologies, Inc., Seattle, WA (US)

(72) Inventor: Shing Yan Lam, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 160 days.

This patent is subject to a terminal disclaimer.

(21) Appl. No.: 15/847,756

(22) Filed: Dec. 19, 2017

(65) Prior Publication Data

US 2018/0114280 A1   Apr. 26, 2018

Related U.S. Application Data

(63) Continuation of application No. 12/165,561, filed on Jun. 30, 2008, now Pat. No. 9,892,468.

(51) Int. Cl.
| | |
|---|---|
| *G06Q 50/00* | (2012.01) |
| *G06Q 30/06* | (2012.01) |
| *G06F 3/0481* | (2013.01) |
| *G06Q 30/02* | (2012.01) |

(52) U.S. Cl.
CPC .......... *G06Q 50/01* (2013.01); *G06F 3/0481* (2013.01); *G06Q 30/0631* (2013.01); *G06Q 30/0252* (2013.01)

(58) Field of Classification Search
None
See application file for complete search history.

(56) References Cited

U.S. PATENT DOCUMENTS

| | | | |
|---|---|---|---|
| 6,266,649 B1 | 7/2001 | Linden et al. | |
| 6,611,881 B1 | 8/2003 | Gottfurcht et al. | |
| 6,961,910 B2 | 11/2005 | Lee et al. | |
| 7,080,139 B1 | 7/2006 | Briggs et al. | |
| 7,082,407 B1 | 7/2006 | Bezos et al. | |
| 7,478,054 B1 | 1/2009 | Adams et al. | |
| 7,703,030 B2 | 4/2010 | Smirin et al. | |
| 7,831,928 B1* | 11/2010 | Rose .................. | G06F 3/04817 715/810 |
| 7,853,661 B2 | 12/2010 | Bristol et al. | |

(Continued)

*Primary Examiner* — Christopher J Fibbi
(74) *Attorney, Agent, or Firm* — Knobbe Martens Olson & Bear, LLP (57) ABSTRACT

A monitoring component installed in a network navigation interface, such as an Internet browser, is disclosed. The monitoring component monitors activity of a user performed via the network navigation interface among one or more network resources, such as e-commerce sites, blogs, media hosting sites, and social networking sites. The monitoring component further enables the user to selected at least one monitored activity to be shared with contacts known to the user. An activity service is provided that notifies the contacts of the selected activity and generates recommendations for the user based on the activities reported by the monitoring component. In this manner, users may share activities of interest with their contacts, as well obtain recommendations about items of possible interest.

20 Claims, 6 Drawing Sheets

(56) References Cited

U.S. PATENT DOCUMENTS

| | | | |
|---|---|---|---|
| 7,966,224 B1 * | 6/2011 | Wagner | G06Q 20/105 |
| | | | 705/14.53 |
| 8,060,463 B1 | 11/2011 | Spiegel | |
| 8,392,836 B1 | 3/2013 | Bau et al. | |
| 9,892,468 B1 | 2/2018 | Lam | |
| 2002/0198882 A1 | 12/2002 | Linden et al. | |
| 2005/0091314 A1 | 4/2005 | Blagsvedt et al. | |
| 2006/0095397 A1 * | 5/2006 | Torres | G06F 16/958 |
| 2007/0199025 A1 | 8/2007 | Angiolillo | |
| 2009/0133069 A1 | 5/2009 | Conness | |
| 2009/0171754 A1 | 7/2009 | Kane et al. | |
| 2009/0171755 A1 | 7/2009 | Kane et al. | |
| 2009/0171968 A1 | 7/2009 | Kane et al. | |
| 2009/0172021 A1 | 7/2009 | Kane et al. | |
| 2009/0172551 A1 | 7/2009 | Kane et al. | |

\* cited by examiner

METHOD AND SYSTEM FOR RECOMMENDING ACTIVITIES TO A COMMUNITY OF CONTACTS

BACKGROUND

In recent years, the Internet has become a popular mechanism for performing activities such as purchasing goods and services, media sharing, commentary, and keeping in contact with friends and associates. In particular, social networking resources have enjoyed relatively rapid growth, as users have become comfortable sharing information electronically. In the future, it is anticipated that these trends will continue to accelerate as more users migrate to the use of computer network resources and network resource offerings expand.

While the growing number of network resource offerings presents new opportunities, it is not without problems. With a small number of network resources, e.g., websites, available, a user may be aware of a significant fraction of the electronic content or services available therefrom that is of interest. However, with the very large number of network resources presently available (and growing) for browsing, it is very difficult for a user to identify more than a relatively small fraction of the electronic content and/or services of interest, despite active searching.

Furthermore, while acquiring network contacts is relatively easy, maintaining meaningful interactions and sharing information with these contacts is more challenging. In one aspect, contacts may sporadically check for messages or other information provided from a user. Alternatively, content a user desires to share with their contacts may not be of interest to the contact, resulting in the user's communications being ignored. As a result, contacts may be lost for lack of maintaining an interaction of mutual interest.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Figure 1:
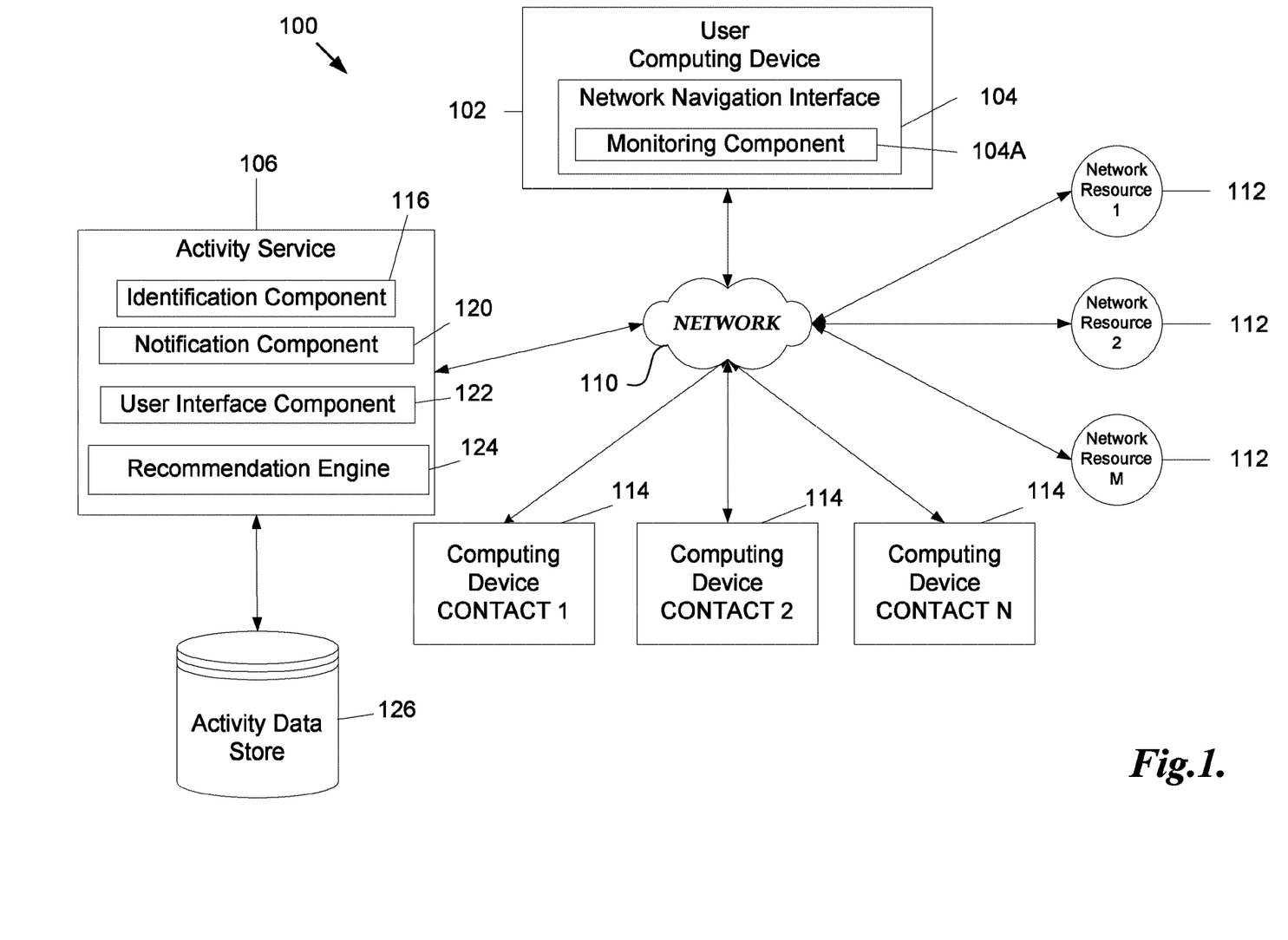
FIG. 1 is a block diagram of an illustrative operating environment for implementing an activity service and a monitoring component that enable a user to recommend selected activities to a community of contacts and that generate recommendations for the user based on the selected activities.

FIG. 1 depicts an illustrative operating environment 100 for implementing an activity service 106 and monitoring component 104A that enables a user of a computing device 102 to recommend selected user activities to contacts (e.g., contacts 1-n) known to the user. Contacts known to the user may also be referred to as the user's "community of contacts," "contact community," or simply, "community." In other embodiments, the activity service 106 further generates recommendations for the user based on the activities reported by the monitoring component 104A, and, in some cases, further based on feedback from, and/or the activities of, the user's contact community.

In the illustrated embodiment, the computing device 102 of the user includes a network navigation interface 104 (e.g., a web or other network resource browser) in which has been installed a monitoring component 104A. In certain embodiments, the monitoring component 104A monitors activities of a user performed via the network navigation interface 104 among one or more network resources 112 (e.g., a website, network data store, etc.) and transmits the monitored activity data to the activity service 106 for further processing. The activity service 106 of FIG. 1 may store the user's monitored activity data in an activity data store 126. Monitored activities may include, but are not limited to, subscription to a network based service, marking a network resource as a favorite, uploading content for viewing from a network resource, purchasing an item, etc.

In one example, a network resource 112 may be an e-commerce website and the monitored activity may include browsing and/or purchasing items presented within the e-commerce website. In another example, the network resource 112 may be a media sharing website which allows posting and sharing of media such as pictures, music, and/or videos. In a further example, the network resource 112 may be a blog website to which the user may post messages or from which the user may view messages. Given that a number of such activities may include viewing or consuming content or information in some manner, those skilled in the art will appreciate that references made herein to recommending an activity may also include recommending content. Moreover, such activities may include subscribing to or selecting one or more services. Accordingly, references made to recommending an activity may also include recommending a service. The activity data store 126 may also store the user's historical activities, whether monitored by the monitoring component 104A or captured as browse session information and provided to the activity service 106 by some other component of the operating environment 100. In addition, the activity data stored in the activity data store 126 may include data related to the user's contact community, e.g., contact information for his or her contacts, notification preferences for his or her contacts, preferences of his or contacts, etc. The preferences, contacts, and historical activity of the user may be provided to the activity service 106 and stored in the activity data store 126 during the configuration of the monitoring component 104A, during activity selection or monitoring, or any combination thereof.

As will be described in more detail below, the monitoring component 104A enables a user to select at least one of the user's activities within the network resources 112 to be shared with one or more of the user's contacts. More specifically, the monitoring component 104A provides the selected activity to the activity service 106, who in turn, notifies the user's contacts of the selected activity. For example, if the user has found an article of particular interest while browsing network resource 104, the user may select a user interface control (e.g., the "Like It!" button 312 shown in FIG. 3) to indicate his or her interest and initiate notification by the activity service 106 to the contact community of the user's interest in the article. The user interface control may be provided by the monitoring component 104A so that it appears in the navigation interface 104 as the user is browsing the network resource 112. The user interface control may be in the form of a button, toolbar, menu item, or other selectable user interface control within the network navigation interface 104 without departing from the scope of the present disclosure. In this manner, a user may share activities with his or her contacts without navigating away from the network resource 112 or using another messaging application (e.g., an email application). Thus, the user may stay connected with friends and colleagues without disruption of the user's activities.

In certain embodiments, the activity service 106 further generates recommendations to the user for other activities based upon the activities monitored and selected using the monitoring component 104A and stored in the activity data store 126. In this manner, a user may obtain recommendations about network resources and activities of possible interest while performing his or her normal network navigation activities. These and other aspects of the present disclosure are described in detail below.

As illustrated in FIG. 1, the network navigation interface 104 and monitoring component 104A may be stored in memory of, and executed by a processing unit of, the computing device 102. In certain embodiments, the computing device 102 may be, but is not limited to, a personal computer, mobile phone, terminal, electronic book reader, laptop computer, digital media player, set-top box or personal digital assistant. The network navigation interface 104 enables the user to navigate to one or more of network resources 112 over a network 110. In one embodiment, the network 110 is the Internet and the network navigation device 104 is an Internet browser. It may be understood, however, that the network 110 may be a local area network (LAN), wide area networks (WAN), a personal area network (PAN), landline telephone network, cellular telephone network, cable network and/or any combination thereof. Embodiments of the network 110 may further be implemented through wired and/or wireless transmission mechanisms. Because protocols for network communications such as TCP/IP are well known to those skilled in the art of computer networks, further description of these protocols and other methods used to implement the network 110 are not provided herein.

The operating environment 100 depicted in FIG. 1 is illustrated as a distributed computer environment including several computer systems that are interconnected using one or more computer networks. However, it will be appreciated by those skilled in the art that the operating environment 100 could have fewer or greater components than are illustrated in FIG. 1. For example, the operating environment 100 could include various web services components and or peer-to-peer network configurations. Thus, the depiction of the operating environment in FIG. 1 should be taken as illustrative and not limiting to the present disclosure.

The monitoring component 104A, in one embodiment, enables monitoring or tracking of the activities performed by the user among one or more network resources 112 using the network navigation interface 104. For example, the monitoring component 104 may be implemented through a plug-in component installed in the navigation interface 104. In alternative embodiments, the monitoring component 104A may be implemented as a discrete component installed on the computing device 102. In yet other embodiments, the monitoring component 104A may be implemented as an overlay, script or other piece of code received from the activity service 106 or another network resource 112, e.g., embedded in a webpage or other document retrieved from the network resource 112 that the user is browsing using the navigation interface 104.

In further embodiments, the monitoring component 104A enables the user to select at least one monitored activity that the user desires to share with one or more contacts. As discussed below, in response to the activity selection, the activity service 106 may identify the user's contacts and notify them of the selected activity through computing devices 114 in communication with the network 110. In certain embodiments, the contact is notified of the selected activity upon receipt of the notification. As with the computing device 102, the computing devices 114 may include, but are not limited to, personal computers, laptops, telephones, mobile phones, personal digital assistants, etc.

In further embodiments, the user may also specify one or more preferences which dictate the manner in which the selected activity is shared with the contact community. In one embodiment, the preferences may be established by the user at the time the activity selection is made. In alternative embodiments, the user may establish the preferences when providing contact information for his or her contacts. In yet other embodiments, the user may associate one or more preferences with a type of activity and/or or certain contacts. For example, the user may specify that certain contacts (e.g., contacts 1 and 3) receive notification of a first type of activity (e.g., selection of a particular blog), while the remaining contacts (e.g., contacts 2 and 4 through n) do not receive notification of the first type of activity. In yet other embodiments, the user may establish a preference for keeping certain activities public or private so that private activities are not shared with the contact community. In this manner, the user may tailor the notifications only to contacts whom he or she believes would be receptive to the notification and/or tailor notifications of only a certain type of activity to his or her contacts, further facilitating meaningful interactions using the monitoring component 104A and activity service 106.

Now that the monitoring component 104A has been described, the activity service 106 will be described in more detail. The activity service 106 may be implemented by a single computing device such as a server. However, those skilled in the art will appreciate that the activity service 106 may be embodied in a plurality of servers, each executing an instance of the activity service 106. The server may include, inter alia, a network interface, memory, processing unit, and computer readable medium drive, all of which may communicate with one another by way of a communication bus. The network interface may provide connectivity to the network 110 and/or other networks or computing systems. The processing unit may communicate to and from memory, which contains computer program instructions that the processing unit executes in order to operate the activity service 106. The memory generally includes RAM, ROM and/or other persistent and auxiliary memory. For example, in one embodiment, the memory includes a user interface component 122 that generates user interfaces (and/or instructions therefor) such as those depicted in FIGS. 3, 4 and 5 for display upon a computing device 102 or 114 via a navigation interface 104. In addition, the memory may include an identification component 116, a notification component 120 and a recommendation engine 124.

In one embodiment, the identification component 116 of the activity service 106 identifies the user from the data transmitted by the monitoring component 104A. For example, the identification component 116 may identify the user based upon one or more cookies generated during installation or configuration of the monitoring component 104A and associated with the user. In alternative embodiments, the identification component 116 may identify the user based upon a username and password transmitted to the activity service 106. As will be discussed in more detail below, once the identification component 116 identifies the user, the identification component 116 may further identify the user's contacts so that the user's community of contacts can be automatically notified of any of the user's selected activities. In one embodiment, the identification component 116 identifies the user's contacts from contact information provided by the user either manually or via download from the user's contact list maintained, e.g., on the computing device 102. In yet other embodiments, the identification component 116 may identify the user's contacts from other accounts associated with the user. For example, if the user maintains an account with another networking service (e.g. social and professional networking), bookmarking service, media hosting (e.g. pictures, video), the identification component 116 may obtain the contacts maintained by the user for such account. Accordingly, the identification component 116 can automatically gather contacts from the user's other accounts and notify all such contacts of the user's selected activities without disrupting the user from his or her normal navigation activities.

Upon identification of the user and his or her contacts, the notification component 120 of the activity service 106 may notify the contacts of the user of the selected activity. In certain embodiments, the notification component 120 may provide the notification according to the user preferences discussed above. In further embodiments, contacts may be notified of the selected activity upon receipt of the notification. The mechanism of delivery of the notification may also depend on the circumstances of the user's contacts. Under circumstances in which a contact possesses a computing device 114 equipped with a network navigation interface 104 also installed with a monitoring component 104A', the notification component 120 may provide the notification to the monitoring component 104A' of the computing device 114 utilized by the contact. However, when the computing device 114 of the contact is not so equipped, the notification component 120 may provide the notification to the contact through alternative mechanisms such as email messages, instant messages, network resource postings, voice mail messages, text messages, etc. Such notification may be considered a recommendation to the contact of the user's selected activity. Accordingly, the contact may choose to also conduct the activity.

Figure 5:
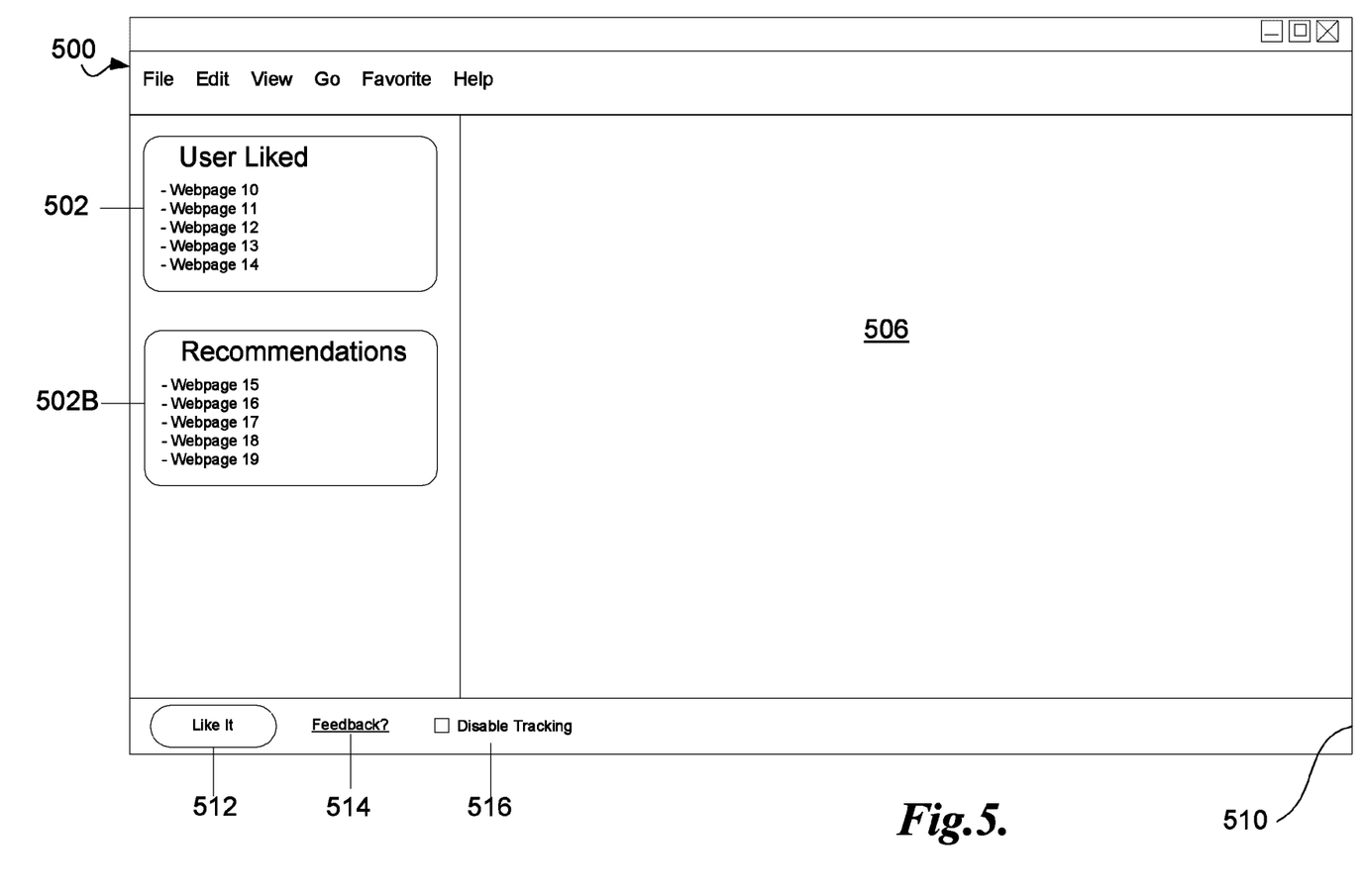

If implemented with a monitoring component 104A', the navigation interface of the contact's computing device 114 may display the notification to the contact in a manner, e.g., as a hyperlink, that can be selected by the contact (see area 502 in FIG. 5). As will be described in more detail below, the contact may also conduct the activity and/or provide other feedback regarding the user's activity. In one embodiment, the contact's monitoring component 104A' provides such feedback to the activity service 106 for further processing. Should the contact also conduct the activity, the monitoring component 104A' will monitor and report the contact's activity to the activity service 106.

The activity service 106 may further include a recommendation engine 124 that generates at least one recommendation to the user based on, e.g., the user's monitored and/or selected activities. The recommendation may be for another activity that the activity engine 106 determines is of interest to the user. In certain embodiments, the activity service 106 may employ the aggregate behavior or other users of the activity service 106 in order to generate the recommendation. In one embodiment, the activity engine 124 may generate such a recommendation based on collaborative filtering, the process of filtering for information or patterns using techniques involving relationships among multiple data sources. In another embodiment, the recommendation provided by the recommendation engine 124 may be based on cluster modeling, the partitioning of a data set into subsets (clusters) so that the data in each subset share some common trait—often proximity according to some defined distance measure. Alternatively, the recommendation may be based on content filtering, a technique whereby content is blocked or allowed based on analysis of its content, rather than its source or other criteria. Moreover, item-to-item collaborative filtering, a technique used to combine different users' opinions and tastes in order to achieve personalized recommendations, may be implemented. There are at least two classes of collaborative filtering: (1) user-based techniques derived from similarity measures between users; and (2) item-based techniques that compare the ratings given by different users. Such techniques may employ proximity functions, relevance functions, similarity functions, and nearness functions to provide recommendations. It may be understood that, in alternative embodiments, the recommendation engine 124 may generate the at least one recommendation to the user based upon the user's monitored and/or selected activities absent the identification of contacts of the user.

In further embodiments, the recommendation engine 124 may also consider the activities of the user's contact community in generating the recommendation. For example, the recommendation engine 124 may consider the activities of one or more of the user's contacts (e.g., contacts 1-n) that have been monitored by a similar monitoring component 104A' executed by the respective computing device 114 utilized by the contact and stored in the activity data store 126. In one embodiment, the contact's activities may be given greater weight by the recommendation engine 124, as compared with the activities of other users, in generating a recommendation. This greater weighting reflects the assumption that the activity of the user's contacts is more likely to reflect activities of potential interest to the user than another user at random.

In the illustrated embodiment, the recommendation engine 124 is a component of the activity service 106. However, in alternative embodiments, a recommendation may be generated by a remote or stand-alone recommendation engine 124 in communication with the activity service 106. The generated recommendation may be communicated to the activity service 106 and subsequently transmitted to the monitoring component 104A of the user's computing device 102 using the notification component 120.

Figure 2A:
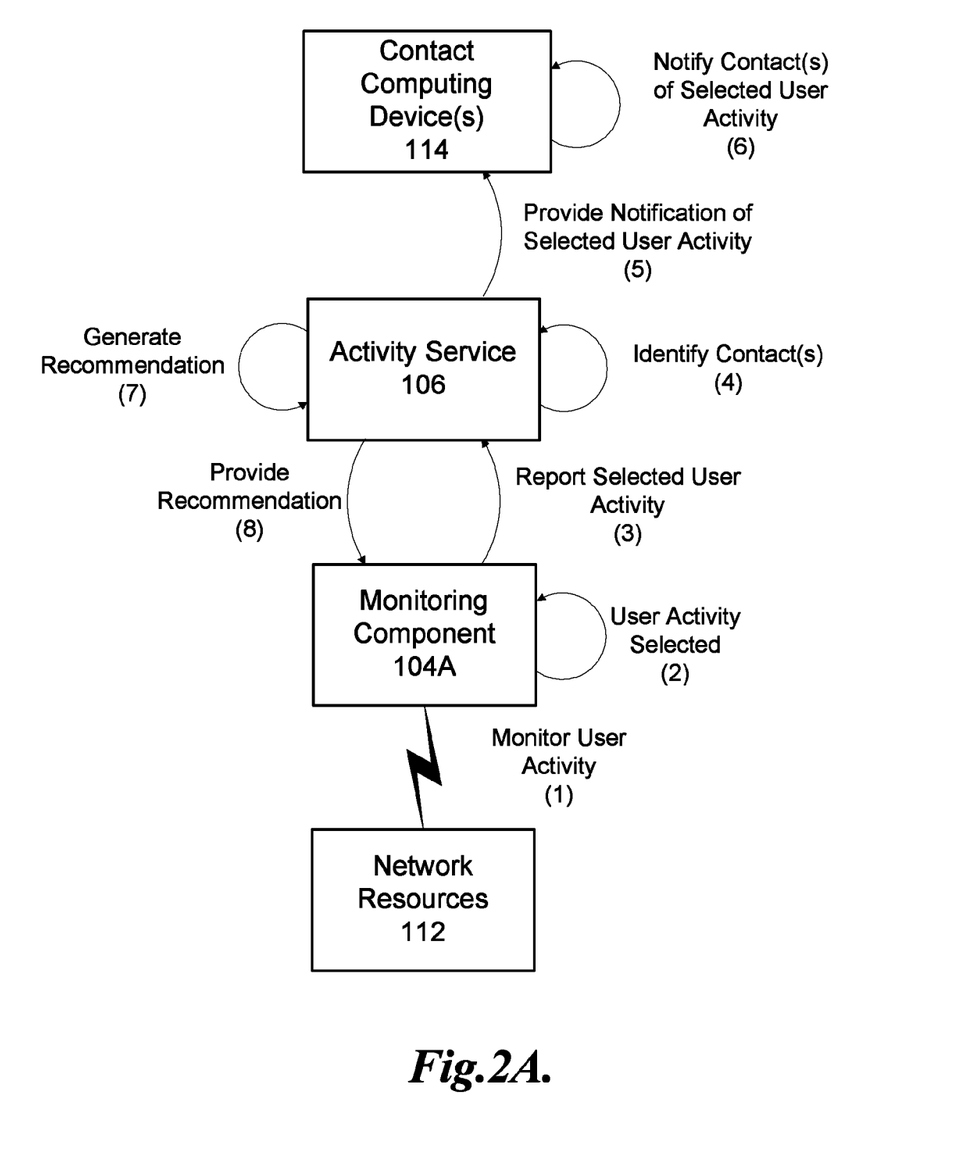
FIGS. 2A and 2B are block diagrams of the operation of the activity service and monitoring component within the operating environment shown in FIG. 1 in accordance with one embodiment.
Figure 3:
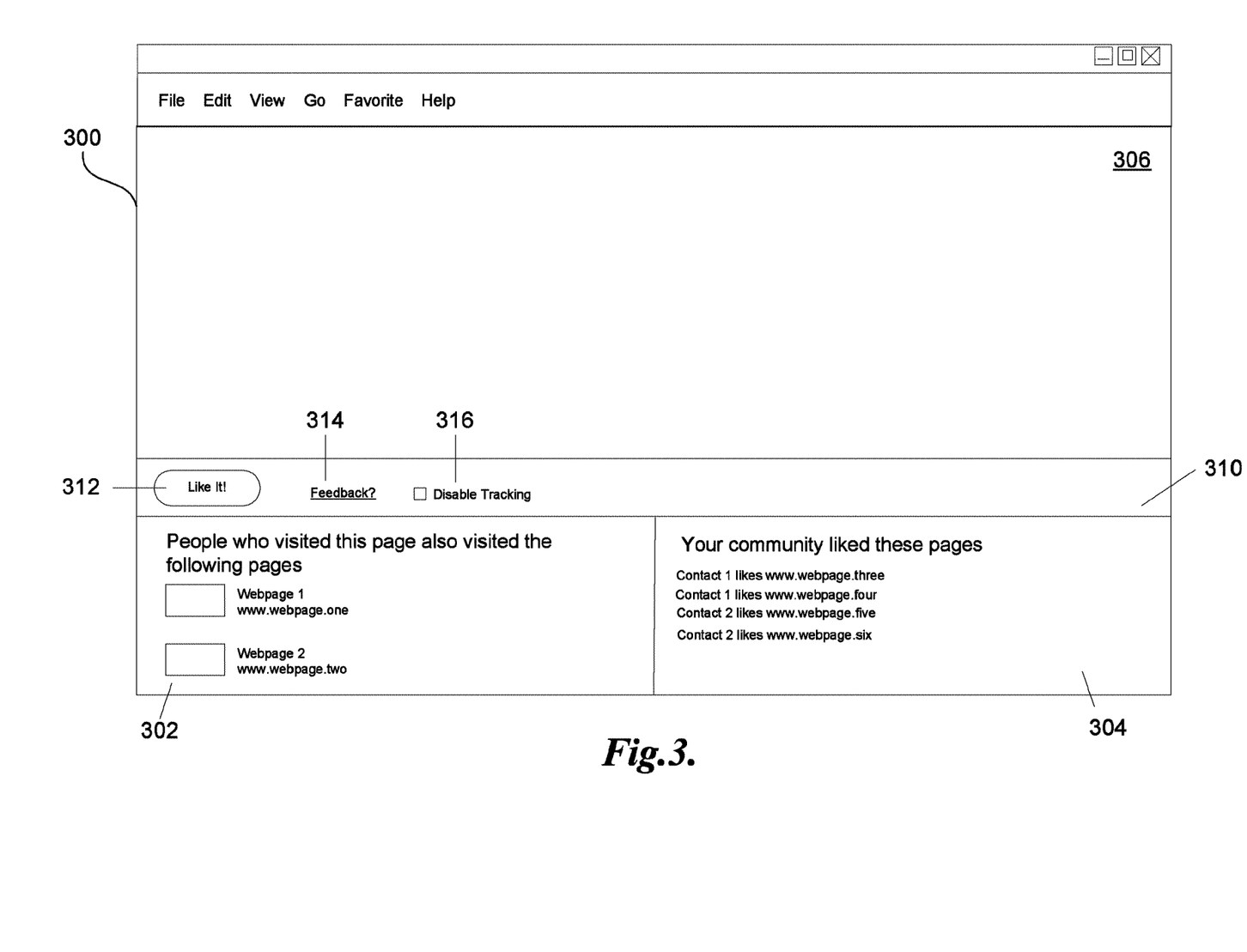
FIGS. 3, 4 and 5 are pictorial diagrams of illustrative user interfaces generated by the activity service for displaying the selected activities and recommendations.

FIG. 2A is a block diagram of the operation of the activity service 106 and the monitoring component 104A within the operating environment 100 shown in FIG. 1 in accordance with one embodiment. As shown in FIG. 2A, the monitoring component 104A installed upon the user's computing device 102 monitors the user's activity among one or more network resources 112. As the user browses, he or she may select an activity of particular interest (e.g., by selecting a "Like It" button 312 as shown in FIG. 3 and described in more detail below), which selected activity may be recommended automatically to the user's community of contacts. Alternatively, the user may designate one or more activities of interest, such as providing the monitoring component 104A with a URL address. More specifically, the monitoring component 104A may report the selected user activity (as well as other monitored activities) to the activity service 106. In turn, the identification component 116 of the activity service 106 may identify the user (e.g., from the user's cookie) and the user's contacts (e.g., from a user account identifier associated with the cookie) who may be interested in the selected activity. As discussed above, the user may specify one or more preferences which dictate the manner in which the selected activity is shared with the contact community. Accordingly, the activity service 106 will identify the contacts with whom the selected activity will be shared in accordance with the user's preferences. For example, all or only a subset of the user's contacts may be notified of the selected activity.

Once the appropriate contact community has been identified, the notification component 120 of the activity service 106 notifies the contacts of the selected activity. In certain embodiments, a notification is sent to the computing devices 114 of the contacts. For example, the notification may be provided to the user immediately upon receipt by the computing devices 114 to notify the contact of the selected activity. Alternatively, the notification may be provided to the user at a selected time after receipt by the computing devices 114. If the computing device 114 of the contact is not equipped or provided with a monitoring component 104A', the notification may be sent to the contact at the computing device 114, but further monitoring of the contact's response to the selected activity or capture of the contact's feedback may not be conducted. As noted above, in such cases, the notification component 120 may provide the notification to the contact through alternative mechanisms such as email messages, other user interfaces presented by the navigation interface 104 (e.g., a pop-up window), instant messages, network resource postings, voice mail messages, text messages, etc.

Figure 4:
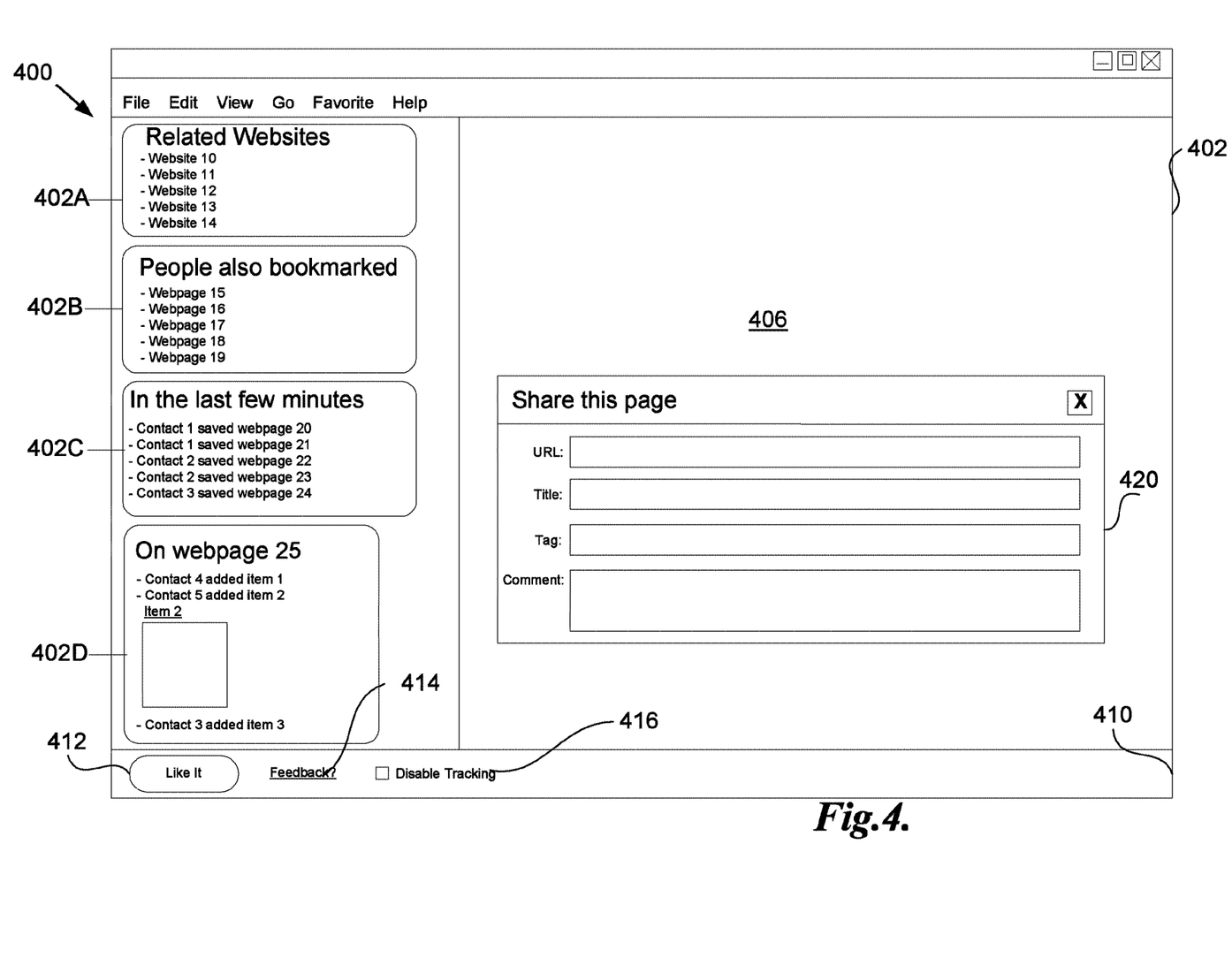

In addition to notifying the user's contact community, the activity service 106 may generate one or more recommendations for the user of other activities that may be of interest and provide the generated recommendations to the user's computing device 102 for display via the monitoring component 104A (see, e.g., area 402A of FIG. 4). More specifically, the recommendation engine 124 may generate a recommendation based on the user's monitored activity, selected activity, historical activity, or any combination thereof. In addition, the recommendation engine 124 may generate a recommendation based on the activities of other users of the activity service 106, including the user's contacts. Examples of recommendations that may be generated by the recommendation engine 124 include, but are not limited to:

Users who viewed/selected this network document (e.g., webpage) also viewed that network document.

Users who viewed/selected this network resource (e.g., website) also viewed that network resource.

Users who commented on/selected this network document also commented on that network document.

Users who purchased this item/selected this item also purchased that item.

Users who selected this advertisement/selected this advertisement also selected that advertisement.

In other embodiments, the recommendation generated by the recommendation engine 124 may further relate to the other users within the operating environment 100. Such recommendations may include, but are not limited to:

These users also selected this network document.

These users made these comments to this network document.

Instant chat with users who are viewing this network document.

Add new contact.

In this fashion, the user is informed about the activities of other users of the activity service 106 who have performed activities which are related or identical to the monitored and selected activities of the user. Recommendations of this type may expose the user to an entirely new set of activities of potential interest which are not based on aggregates or the contacts of the user. In a further aspect, the user may invite other users of the activity service 106 to join his or her community of contacts based upon the activities performed by the other users, productively expanding the user's community of contacts.

Figure 2B:
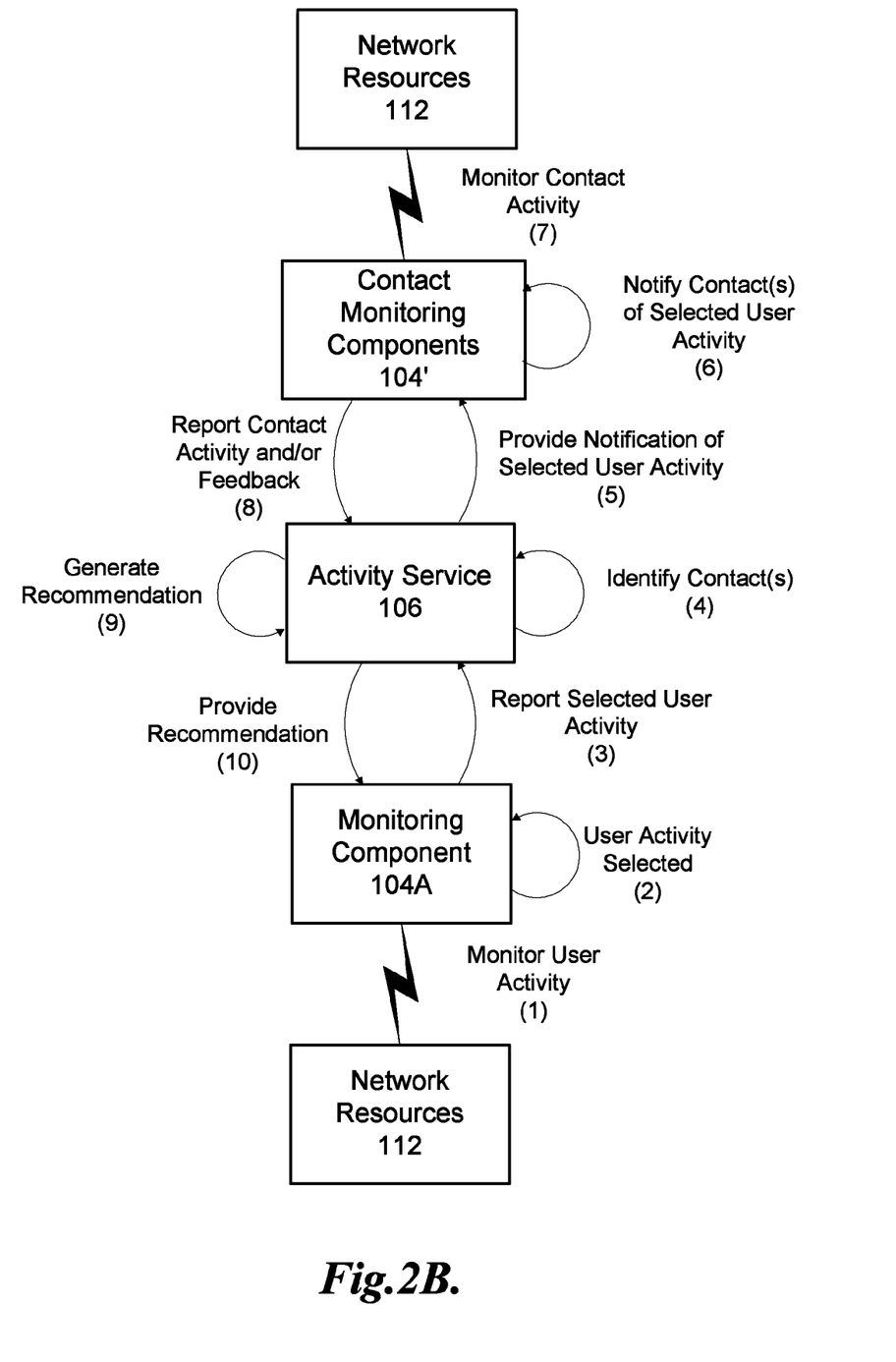

FIG. 2B is a block diagram of the operation of the activity service 106 and the user's monitoring component 104A within the operating environment 100 in an embodiment where one or more of the user's contacts also has installed a similar monitoring component 104A' on his or her computing device 114. As shown in FIG. 2B, the user's monitoring component 104A monitors the user's activity among one or more network resources 112. As the user browses, he or she may select an activity of particular interest for the user (e.g., by selecting a "Like It" button 312 as shown in FIG. 3 and described in more detail below), which selected activity may be recommended automatically to the user's community of contacts as described above.

Once the appropriate contact community has been identified, the notification component 120 of the activity service 106 may send a notification of the selected activity to the monitoring component 104' of the contact's computing device 114. Accordingly, the selected activity may be displayed to the contact via the navigation interface 104 (e.g., "User Liked" area 502 of user interface 500 shown in FIG. 5) upon receipt of the notification by the monitoring component 104'. In yet other embodiments, notification may be made via email messages, instant messages, etc., as described above. In the illustrated embodiment, the contact's computing device 114 is also equipped with a monitoring component 104A'. Accordingly, the contact may also conduct the activity selected by the user. If so, the monitoring component 104A' will report the contact's selection to the activity service 106, which, in turn, may notify the contact's community of the selected activity. In addition, the activity service 106 may use the contact's selected activities, monitored activities and/or historical activities to generate further recommendations for the contact/and or the user.

In yet other embodiments, a contact may also provide feedback to the activity service 106 regarding the activity of the user for which the contact has been notified, e.g., by selecting a feedback option 514 as shown in FIG. 5. For example, the contact may rate or review the selected activity, which ratings or review may be used by the activity service 106 to generate further recommendations for the contact and/or the user as described above. Examples of such feedback may include, but are not limited to:

This percentage of your contacts (and/or these individual contacts) viewed this selected activity.

This percentage of your contacts (and/or these individual contacts) enjoyed this selected activity.

These individual contacts commented on this selected activity. Click to view comments.

Your contacts rated this selected activity AA out of BB.

Instant chat with your contacts who are viewing this selected activity.

The feedback may be aggregated and further analyzed by the activity service 106 and then provided for display to the user. For example, the activity service 106 may determine the percentage of contacts who viewed the user's selected activity, the average rating for the activity, etc. Such feedback may provide the user and his or her community of contacts with a satisfying, closed loop communication which facilitates the exchange of information and strengthens the bonds of community between the user and his or her contacts. Moreover, by receiving the monitored and selected activities of the contacts, as well as their feedback, the activity service 106 acts as a recommendation hub for a network of communities, the activities of whose members are provided to the activity service 106 by monitoring components 104A incorporated within network navigation interfaces 104 utilized by the members. Accordingly, the more users that utilize the activity service 106, the more (and better) recommendations and feedback the activity service 106 processes. The more recommendations and feedback activity service 106 processes, the more users utilize the activity service 106.

FIGS. 3, 4, and 5 are pictorial diagrams of illustrative user interfaces generated by the activity service 106 as the user selects activities and the user's contact community is notified of such activities. In one embodiment, the user interfaces are displayed by the network navigation interface 104 equipped with the monitoring component 104A. As shown in FIG. 3, a user interface 300 may include a toolbar 310 provided by the monitoring component 104A that presents various user interface controls, e.g., "Like It" button 312, feedback option 314, and disable tracking option 316, for selection by the user. Accordingly, as the user is browsing the network resources 112, the user may select the activity currently being conducted (e.g., an article displayed in a main area 306 of the user interface 300) by activating the "Like It" button 312. As described above, the monitoring component 104A will report the selected activity to the activity service 106, which, in turn, will notify the user's contact community of the selected activity (see FIG. 5). The user may also choose to disable tracking by the monitoring component by selecting the disable tracking option 316. For example, a user may wish to perform an activity which is out of the ordinary and does not wish for such activity to be considered when generating recommendations. In further embodiments, activity selection may still be performed while tracking disable is active.

In addition, or alternatively, the user may choose to provide feedback regarding the current activity by selecting the feedback option 314. For example, the user may desire to make comments when reading content of interest displayed in the main area 306. In one embodiment, contacts may be notified of such comments when they are generated. In alternative embodiments, the comments may be made available to the contact upon browsing the content. For example, the user may select an activity such as viewing a video and generate a comment for any contacts which choose to also view the video.

As also described above, the activity service 106 may generate recommendations for the user based on the user's monitored, selected and/or historical activities. As shown in FIG. 3, such recommendations may further be displayed in a recommendations area 302 of the user interface 300 (e.g., under a heading "People who visited this page also visited the following pages.") If a similar monitoring component 104A' is also installed on the computing devices 114 of the user's contacts, then the activities selected by such contacts may also be displayed to the user in a community area 304 of the user interface 300 (e.g., under the heading "Your community liked these pages.")

FIG. 4 depicts an alternative embodiment of a user interface 400 generated by the activity service 106 and displayed by the navigation interface 104 of the user's computing device 102. User interface 400 also includes a toolbar 410 presenting a "Like It" button 412, a feedback option 414, and a disable tracking option 416. However, in the illustrated embodiment, selection of the "Like It" button 412 causes display of a dialog box 420 that enables the user to input additional information regarding the activity being selected, e.g., a Uniform Resource Locator, a title, a tag, and comments for the network document containing the selected activity. Accordingly, such information may be stored in the activity data store 126 and provided by the activity service 106 to the contact community along with or subsequent to notification of the selected activity.

As also shown in FIG. 4, the user interface 400 may present a variety of recommendations generated by the activity service 106. For example, such recommendations may include recommendations 402A for related network resources, e.g., websites. As yet another example, such recommendations may include recommendations 402B indicating that users who performed an activity, such as visiting or bookmarking a network document, e.g., a webpage, also visited or bookmarked other webpages. In yet another embodiment, the user interface 400 may display recommendations 402C or 402D indicating that users who performed an activity, such as visiting a website, also visited and saved webpages hosted at the same website.

FIG. 5 depicts an illustrative user interface 500 that may be displayed to a contact of the user by a navigation interface 104 installed on the contact's computing device 114. In the illustrated embodiment, the contact's navigation interface 104 is equipped with a monitoring component 104A' that monitors the activity of the contact and provides the contact with a toolbar 510 having user interface controls for selecting an activity (e.g., a "Like It" button 512), providing feedback (e.g., feedback option 514) and disabling tracking (e.g., disable tracking option 516). In the illustrated embodiment, notification of the user's selected activities is displayed as they are received, e.g., in a "User Liked" area 502. Accordingly, if the user selects more than one activity, a plurality of selected activities may be displayed and dynamically updated as the user continues to browse and select activities of interest. In one embodiment, the user's selected activities are presented as a hyperlink that may be activated by the contact. In such cases, the corresponding activity may be retrieved from its host network resource 112 and displayed in the main area 506 of the user interface 500 for the contact's consumption. The contact may then select the activity (e.g., using the "Like It" button 512) and/or provide feedback regarding the selected activity (e.g., using the feedback option 514). As discussed above, the activity selected by contact and the contact's feedback are reported by the monitoring component 104A to the activity service 106 for further processing.

As also shown in FIG. 5, the user interface 500 may also present additional recommendations 502B to the contact based on the contact's monitored activity, selected activity, historical activity, or combinations thereof. Those skilled in the art will appreciate that the user interface controls, the notification of community activities, the recommendations made by the activity service 106, the feedback provided by the community, and/or any data or information related thereto may be presented in the user interfaces in a variety of ways. Accordingly, the user interfaces depicted in FIGS. 3, 4 and 5 are illustrative and should not be construed as limiting. In addition, in other embodiments, the user's own activities and recommendations, as well as those activities recommended to the user by others may be maintained and accessed by the user from a separate network resource, e.g., a website, as opposed to contemporaneously presented to the user while browsing.

In addition, in the embodiments illustrated in FIGS. 3, 4 and 5, the user interface control that enables the user (or contact, as the case may be) to initiate notification to his or her contact community of a selected activity is described as a "Like It" button, i.e., a control that indicates the user feels favorably regarding the selected activity. However, in other embodiments, the user may wish to indicate that he or she feels unfavorably regarding the selected activity. In such cases, the selection user interface control may be configured negatively, e.g., as a "Dislike It" button. In yet other embodiments, the selection user interface control may be configured in a neutral manner (e.g., as a "Tell My Contacts" button). The user may then be further prompted for feedback, e.g., comments, a rating, a review, etc. to be communicated with the selected activity to the contact community.

In further embodiments, at least a portion of the information received by the activity service 106 may be made available to the user at a centralized network resource, such as a web site, for review, modification, or addition. The information may include, but is not limited to, the user's monitored activities, the user's selected activities, the user's recommendations, the activities selected by the user's contacts, and feedback from the user's contacts on the user's selected activities. For example, navigation to the network resource may allow the user to browse web pages saved by their contacts and comment on them. Alternatively, the activity service 106 may make available, within the centralized network resource, selected information aggregated from the users of the activity service 106, such as popular activities, popular network resources, popular users, and the like.

In summary, embodiments of the present disclosure provide systems and methods by which users may extend their network navigation experience by receiving personalized recommendations and sharing selected activities with contacts. The recommendations may be tailored to the navigation habits of the user based upon observed behaviors of other users, providing a high likelihood of relevance to the user. Furthermore, relationships between the user and their social and professional contacts may be strengthened when each provides notification of selected navigation activities and feedback regarding the selected navigation activities to the other.

Embodiments of the present disclosure have been described with reference to the drawings. As will be recognized, many of the features embodied within the disclosed systems and methods may be implemented or used without others. Numerous implementation details have been set forth in the description in order to illustrate, but not limit, the disclosure.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language, such as, among others, "can," "could," "might," or "may," unless specifically stated otherwise, or otherwise understood with the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features elements, and/or steps are included or are performed in any particular embodiment.

Any process descriptions, elements, or blocks in the flow diagrams described herein, and/or depicted in the attached figures, should be understood as potentially representing modules, segments, or portions of code which include one or more executable instructions for implementing specific logical functions or steps in the process. Alternative implementations are included within the scope of the embodiments described herein which elements or functions which may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A non-transitory computer-readable storage medium having computer-executable instructions for recommending activities, the computer-executable instructions comprising:
monitoring instructions configured for integration with a network navigation browser, the network navigation browser comprising a main area, a recommendations area, and a community area, and a user interface control, wherein the monitoring instructions, when executed, cause one or more computing devices to:
monitor one or more activities of a user performed via the network navigation browser among one or more network resources, wherein the one or more activities comprises at least one of: subscribing to a network based service, marking a network resource as a favorite, uploading content for viewing from a network resource, or purchasing an item; and
enable the user to select, via the user interface control of the network navigation browser, at least one monitored activity to be recommended to a contact of the user; and
activity instructions, that when executed, cause the one or more computing devices to:
identify the contact of the user based on preferences and the at least one monitored activity selected by the user, wherein the preferences identify at least a first contact associated with a first monitored activity and at least a second contact different than the first contact and associated with a second monitored activity;
notify the identified contact of the at least one monitored activity selected by the user by providing a notification for display within an area of network navigation browser of the contact; and
generate a recommendation for an activity for display in the recommendations area; and
generate a notification of at least one monitored activity selected by the contact, for display in the community area.

2. The non-transitory computer-readable storage medium of claim 1, wherein the activity instructions, when executed, cause the one or more computing devices to generate the recommendation for the activity based on at least one of the monitored activity of the user, the at least one monitored activity selected by the user, or historical activity of the user.

3. The non-transitory computer-readable storage medium of claim 1, wherein the activity instructions are further operative to cause the one or more computing devices to generate, for the user, a recommendation for an activity based on at least one of the activity of the contact or feedback from the contact.

4. The non-transitory computer-readable storage medium of claim 1, wherein the activity instructions are further operative to cause the one or more computing devices to generate, for the user, a recommendation based on at least one of activity of other users or feedback from other users.

5. The non-transitory computer-readable storage medium of claim 1, wherein the activity instructions are further operative to cause the one or more computing devices to obtain at least one monitored activity selected by the contact.

6. The non-transitory computer-readable storage medium of claim 1, wherein the activity instructions are further operative to cause the one or more computing devices to notify the contact by at least one of a user interface display, an email message, an instant message, a network resource posting, a voice mail message, or a text message.

7. The non-transitory computer-readable storage medium of claim 1, wherein the monitoring instructions are further operative to cause the one or more computing devices to enable the user to input feedback regarding the at least one monitored activity selected by the user.

8. The non-transitory computer-readable storage medium of claim 1, wherein the monitoring instructions are further operative to cause the one or more computing devices to enable the user to disable monitoring of the one or more activities of the user.

9. A computer-implemented method for recommending activities to one or more contacts known to a user, the computer-implemented method comprising:
  obtaining a report of one or more monitored activities of the user navigating among one or more network resources via a network navigation browser, the network navigation browser comprising a main area, a recommendations area, and a community area, and a user interface control, wherein the one or more monitored activities comprises at least one of: subscribing to a network based service, marking a network resource as a favorite, uploading content for viewing from a network resource, or purchasing an item;
  obtaining a selection by the user, via the user interface control, of at least one monitored activity;
  identifying the contact of the user that is to receive a notification of the selected at least one monitored activity selected by the user based on preferences and one or more of the monitored activities within the report, wherein the preferences identify at least a first contact associated with a first monitored activity and at least a second contact different than the first contact and associated with a second monitored activity;
  notifying the identified contact of the at least one monitored activity selected by the user by providing a notification for display within an area of a network navigation browser of the contact; and
  generating a recommendation for an activity for display in the recommendations area; and
  generating a notification of at least one monitored activity selected by the contact, for display in the community area.

10. The computer-implemented method of claim 9, further comprising recommending to the user another activity.

11. The computer-implemented method of claim 10, wherein the other activity is recommended based upon at least one of the at least one monitored activity selected by the user, monitored activity of the user, or historical activity of the user.

12. The computer-implemented method of claim 10, wherein the other activity is recommended based on at least one of activity of the contact or feedback from the contact.

13. The computer-implemented method of claim 10, wherein the other activity is recommended based on at least one of activity of other users or feedback from other users.

14. The computer-implemented method of claim 13, wherein the feedback comprises at least one of comments made by the contact regarding the at least one monitored activity selected by the user, a rating made by the contact regarding the at least one monitored activity selected by the user, or a review made by the contact regarding the at least one monitored activity selected by the user.

15. The computer-implemented method of claim 9, wherein the contact is identified from contact information provided by the user.

16. The computer-implemented method of claim 9, wherein the contact is identified from contact information found in accounts associated with the user.

17. A system for recommending an activity to a community of contacts of a user, the system comprising:
  a data store configured to store one or more monitored activities of a user, said user able to navigate among one or more network resources via a network navigation browser, the network navigation browser comprising a main area, a recommendations area, and a community area, and a user interface control, wherein the one or more monitored activities comprises at least one of: subscribing to a network based service, marking a network resource as a favorite, uploading content for viewing from a network resource, or purchasing an item; and
  a computing device in communication with the data store that is operative to:
  identify a monitored activity of the user for storage in the data store;
  identify a community of contacts of the user based on preferences and the monitored activity stored by the data store, wherein the preferences identify at least a first contact associated with a first monitored activity and at least a second contact different than the first contact and associated with a second monitored activity;
  obtain a selection by the user, via the user interface control, of the monitored activity;
  notify the community of contacts of the monitored activity selected by the user upon receipt of an indication of the selection by providing a notification for display within an area of a network navigation browser of a community member; and
  generate a recommendation for an activity for display in the recommendations area; and
  generate a notification of at least one monitored activity selected by the contact, for display in the community area.

18. The system of claim 17, wherein the computing device is further operative to obtain a selection, by at least one contact in the contact community, of at least one monitored activity of the contact of the user.

19. The system of claim 17, wherein the computing device is further operative to notify a community of contacts for the contact of the at least one monitored activity selected by the contact of the user.

20. The system of claim 17, wherein the computing device is further operative to generate at least one recommendation based at least in part upon the activity of at least one contact in the contact community.

* * * * *